United States Patent [19]

Sdika

[11] Patent Number: 4,744,655
[45] Date of Patent: May 17, 1988

[54] METHOD AND DEVICE PERMITTING FACILITATION OF THE LATERAL ANGULAR ADJUSTMENT OF A VEHICLE HEADLIGHT

[75] Inventor: Claude Sdika, Saint Martin le Vinoux, France

[73] Assignee: Societe d'Automatisme et de Reglage Optique, France

[21] Appl. No.: 851,606

[22] Filed: Apr. 14, 1986

[30] Foreign Application Priority Data

Apr. 15, 1985 [FR] France .................. 85 05639

[51] Int. Cl.⁴ ............................................. G01J 1/00
[52] U.S. Cl. ...................................... 356/121; 33/288
[58] Field of Search ................... 356/121, 122, 123; 33/288

[56] References Cited

U.S. PATENT DOCUMENTS

| 3,077,139 | 2/1963 | Todd et al. ................. 356/121 |
| 3,386,333 | 6/1968 | Preston . |
| 3,467,473 | 9/1969 | Preston . |
| 3,515,483 | 6/1970 | Irwin ........................ 356/121 |
| 3,532,432 | 10/1970 | Mansour . |
| 3,746,449 | 7/1973 | Schick . |
| 3,791,740 | 2/1974 | Proefrock . |
| 3,822,944 | 7/1974 | Hopkins et al. . |

FOREIGN PATENT DOCUMENTS

| 0043810 | 1/1982 | European Pat. Off. . |
| 2217944 | 6/1974 | France . |
| 25657 | 2/1977 | Japan ....................... 356/121 |
| 156531 | 9/1982 | Japan ....................... 356/121 |
| 199934 | 12/1982 | Japan ....................... 356/122 |

Primary Examiner—R. A. Rosenberger
Attorney, Agent, or Firm—Beveridge, DeGrandi & Weilacher

[57] ABSTRACT

YAn apparatus for and a method of adjustment, in the lateral direction, of the light beam of a vehicle headlight, in its low beam position. The light beam extends on one side of a cut-off line. At least two vertically extending, elongated photoelectric cells are placed in the light beam, in such a manner that the upper part of each photoelectric cell is not illuminated by the headlight and which the lower part is illuminated, regardless of the position of adjustment, in the vertical direction, of the headlight. When the headlight is at its position of correct lateral adjustment, the electrical signals supplied by the photoelectric cells have a specified ratio. In laterally adjusting the position of the headlight, the electrical signals supplied by the photoelectric cells are brought to the specified ratio.

14 Claims, 2 Drawing Sheets

METHOD AND DEVICE PERMITTING FACILITATION OF THE LATERAL ANGULAR ADJUSTMENT OF A VEHICLE HEADLIGHT

BACKGROUND OF THE INVENTION

The present invention relates to a method and a device which permit facilitation of the angular adjustment, in the horizontal direction, of the light beam of vehicle headlights, in their low beam position.

It is currently possible to adjust the headlights of vehicles in two different ways, one being mechanical and the other visual. In mechanical adjustment, a gauge is placed on the lens of a headlight and the headlight is adjusted angularly to bring the gauge to a specified orientation. However, this type of adjustment does not take into account the light beam emitted by the headlight. In visual adjustment, the operator places perpendicular to the light beam a screen on which lines serving for reference purposes are traced, and the operator adjusts the headlight angularly to bring certain zones of the light beam onto these lines. However, this type of adjustment is not satisfactory, as the variation of intensity of the light beam is not easy to distinguish and, after several adjustment operations, the eye of the operator becomes inadequate.

SUMMARY OF THE INVENTION

The object of the present invention is to avoid the difficulties of the techniques which are currently employed, and the present invention permits correct adjustment, without particular difficulties, of headlights in the lateral direction, even if the headlights are not properly adjusted in the vertical direction.

The method according to the present invention, which permits facilitation of the angular adjustment, in the lateral direction, of the light beam of a vehicle headlight, in its low beam position, consists of placing in the path of the light beam of the headlight at least one elongate photoelectric cell, or an elongate series of photoelectric cells, in such a manner that the sensitive cell surface is in part illuminated, regardless of the vertical position of the headlight, with the result that when the headlight is in its correct lateral position, the electrical signal supplied by this photoelectric cell is at a specified value, preferably at its maximum value, and in adjusting the headlight laterally to bring the electrical signal from the photoelectric cell to the specified value.

Although the use of a single photoelectric cell may be sufficient to effect the lateral angular adjustment of the headlight, the present invention proposes preferably placing in the light beam of the headlight at least two elongate photoelectric cells, or two series of photoelectric cells, in such a manner that their sensitive surfaces are in part illuminated, regardless of the vertical position of the headlight, in comparing the electrical signals supplied by these photoelectric cells due to the light to which they are subjected and in adjusting the headlight laterally in such a manner that the electrical signals are in a specified ratio.

The present invention further proposes a device which permits facilitation of the angular adjustment, in the lateral direction, of the beam of light of a vehicle headlight, in its low beam position, which device comprises a lens locatable in front of the headlight and adapted to focus the light beam emitted by the latter, at least two elongate photoelectric cells, or two elongate series of cells, the sensitive surfaces of which are substantially in the focal plane of the lens and turned towards the latter, the photoelectric cells being disposed in such a manner that, regardless of the vertical position of the headlight, the cut-off line of the light beam cuts across the photoelectric cells in such a manner that they are in part illuminated, with the result that in the position of correct lateral adjustment of the headlight, the electrical signals which the photoelectric cells supply, and which are dependent upon the quantities of light which they respectively receive, are in a specified ratio, means for comparing the electrical signals supplied by the photoelectric cells and for providing information relating to the lateral position of the headlight in relation to its position of correct lateral adjustment, and indicating means which are dependent upon the information provided by the said comparing means and which permit indication of the lateral position of the headlight in relation to its position of correct lateral adjustment.

According to the present invention, the photoelectric cells are preferably disposed substantially vertically in positions such that, in the position of correct lateral adjustment of the headlight, the photoelectric cells extends on both sides of the zone of more intense illumination of the light beam emitted by the headlight.

According to the present invention, the electrical signals which the photoelectric cells provide in the position of correct lateral adjustment of the headlight preferably are equal.

According to the present invention, the photoelectric cells are preferably disposed substantially vertically in positions such that, in the position of correct lateral adjustment of the headlight, the apex of the V of cut-off of the light beam emitted by the headlight is on one of the said cells.

To permit the adjustment of headlights of vehicles intended to be driven on the left as well as the adjustment of headlights of vehicles intended to be driven on the right, the device according to the present invention may advantageously include a third photoelectric cell, or series of such cells, disposed symmetrically in relation to the photoelectric cell on which the apex of the V of cut-off of the light beam of the headlight is situated, this third cell being connected to comparing means to compare the currents supplied by this third photoelectric cell and the central photoelectric cell and to supply to the indicating means information relating to the lateral position of the headlight in relation to its position of correct lateral adjustment.

According to the present invention, the comparing means preferably comprises a difference circuit or comparator to compare the electrical signals supplied by the photoelectric cells, and the indicating means preferably comprises an electronic switching device which is dependent upon the output information of the difference circuit, the switching device providing three outputs which are respectively connected to three indicating lights, in such a manner that one of the positions of the electronic switching device is associated with the correct lateral adjustment of the headlight, while the other two positions of the electronic switching device are associated with positions of incorrect adjustment of the headlight, on one side or the other respectively, in relation to the position of correct lateral adjustment.

According to the present invention, the vertical length of each photoelectric cell, or series of such cells, is at least equal to the product of the tangent of the maximum vertical angular displacement of the headlight and the focal length of the lens.

BRIEF DESCRIPTION OF THE DRAWINGS

The present invention will be better understood on studying devices permitting facilitation of the angular adjustment of a vehicle headlight in the lateral direction, which devices are described by way of non-limiting examples and are illustrated in the drawings, in which.

DETAILED DESCRIPTION OF PREFERRED EMBODIMENTS

Figure 1:
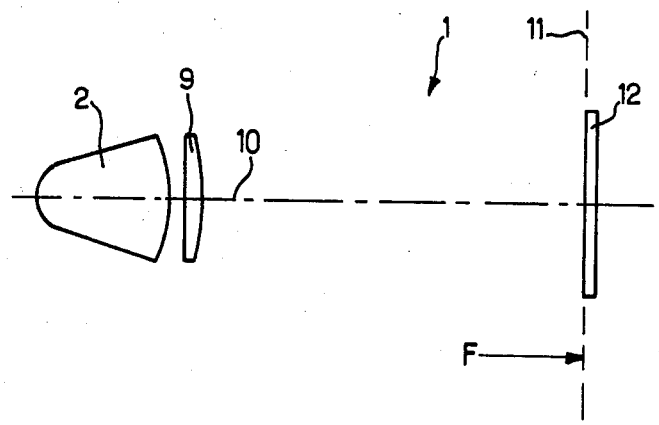
FIG. 1 represents, very schematically, a view of the device in the light beam of a headlight.

FIG. 1 illustrates the adjustment device 1 used to facilitate the adjustment of the angular position of a vehicle headlight 2.

Figure 2:
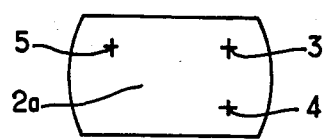
FIG. 2 represents, very schematically, in side elevation, a first mode of adjustment of a headlight.
Figure 3:
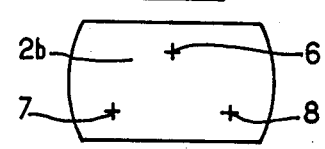
FIG. 3 represents, very schematically, in side elevation, a second mode of adjustment of a headlight.

In the current technique, the headlights are provided with angular adjustment means, which are well known and which permit adjustment of the headlight orientation not only in a vertical direction but also in a horizontal direction. FIG. 2 shows on a headlight a fixed point 3 and two adjustment points 4 and 5. Points 3, 4 and 5 form a right triangle, the side 3, 4 of which is substantially vertical and the side 3, 5 of which is substantially horizontal. Headlight 2a may be pivoted about the vertical line 3, 4 by action on point 5, in order to effect adjustment of the headlight in the lateral direction. Similarly, headlight 2a may be pivoted about the substantially horizontal line 3, 5 by action on point 4, in order to effect adjustment of the headlight in the vertical direction. By virtue of this construction, the adjustment in the lateral direction and the adjustment in the vertical direction of the headlight 2a are independent. FIG. 3 shows, on the other hand, on a headlight 2b a fixed point 7 and two adjustment points 6 and 8. Points 7 and 8 are on a substantially horizontal line, but fixed point 7 is not vertically aligned with adjustment point 6. Action on adjustment point 6 only modifies the vertical adjustment of headlight 2b, while action on adjustment point 8 modifies the adjustment of the headlight 2b both in the vertical direction and in the lateral direction. This means that it is not possible to adjust headlight 2b in the lateral direction only.

Referring once again to FIG. 1, adjustment device 1 includes a lens 9 which is disposed just in front of headlight 2 in such a manner that the axis 10 of lens 9 extends horizontally and passes approximately through the center of headlight 2. Lens 9 focuses the light emitted by headlight 2 on a plane 11 perpendicular to the axis 10 and situated substantially at the focal length of the lens 9.

Device 1 also includes a screen 12 which extends substantially in vertical plane 11 and which carries photoelectric cells, the sensitive surfaces of which are oriented towards lens 9 and extend in vertical plane 11. The arrangement of these photoelectric cells in plane 11 is described hereinbelow.

Figure 4:
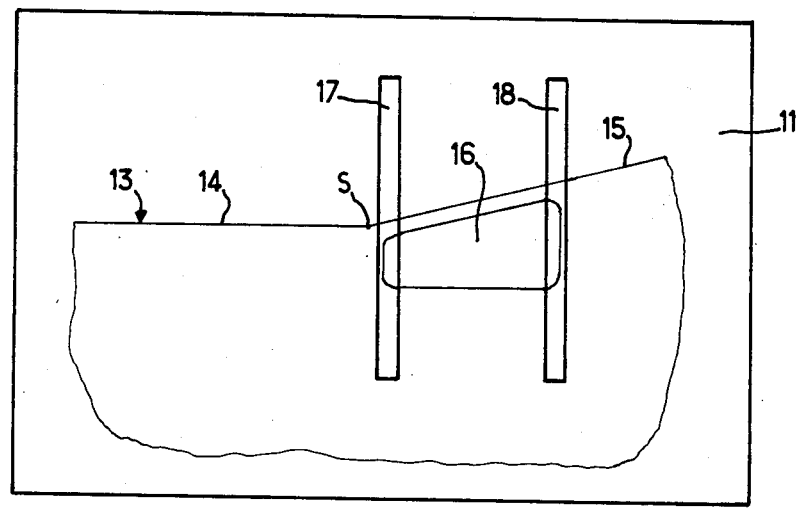
FIG. 4 represents a view, in the direction of arrow F of FIG. 1, of a first device according to the present invention.

With reference to FIG. 4, headlight 2 emits in the low beam position, a light beam which determines in the plane 11 an angled pattern or V of cut-off 13, below which the light beam appears. V of cut-off 13 exhibits on the left-hand part of the drawing a horizontal cut-off line 14 and on the right-hand part of the drawing an inclined cut-off line 15, lines 14 and 15 intersecting at apex 5. In the illuminated area, below V of cut-off 13, the light beam produces a zone of more intense illumination 16. This zone of more intense illumination 61 is substantially oval and extends just below the inclined cut-off line 15 and just to the right of the apex S.

It should be noted that when headlight 2 is properly adjusted in its lateral direction, apex S is customarily substantially in the vertical plane passing through axis 10.

As can be seen in FIG. 4, device 1 includes two elongate photoelectric cells 17 and 18, the sensitive surfaces of which are in the plane 11 and are, in the example, of the same length and disposed vertically at the same height. Photoelectric cells 17 and 18 are disposed in such a manner as to be cut across by the cut-off line 13 of the light beam emitted by headlight 2, in such a manner that photoelectric cells 17 and 18 are, in their lower part, illuminated and, in their upper part, not illuminated, regardless of the angular orientation of headlight 2 in its vertical direction, within the limits of its possible angularly vertical adjustability. Furthermore, in this example, photoelectric cells 17 and 18 are disposed in such a manner that, in the position of correct lateral adjustment of the headlight 2, photoelectric cells 17 and 18 extend both above and below the zone of more intense illumination 16 of the light beam of headlight 2, the left-hand and right hand borders of this zone covering them, however, to a slight extent. It should be noted that inclined cut-off line 15 cuts across cells 17 and 18. In this embodiment, the photoelectric cells 17 and 18 are, moreover, disposed in such a manner that, in the position of correct lateral adjustment of headlight 2, photoelectric cells 17 and 18 supply equal electric currents which are due to the quantities of light to which they are subjected and whose ratios are independent of the angular adjustment, in the vertical direction, of the headlight 2.

In practice, it may appear advantageous to design the photoelectric cells 17 and 18 by means of two series of photoelectric cells disposed, in an adjacent manner, one above the other.

Figure 5:
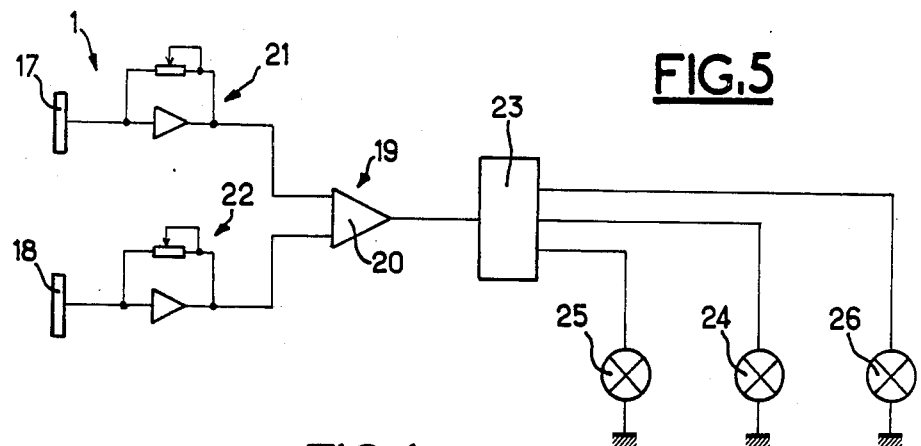
FIG. 5 represents the electronic circuit associated with the device shown in FIG. 4.

With reference to FIG. 5, it is seen that device 1 also includes an electronic circuit 19 which includes comparing means connected to photoelectric cells 17 and 18 and indicating means dependent upon these comparing means.

Photoelectric cells 17 and 18 are connected to two inputs of a difference circuit or comparator 10 via amplifiers 21 and 22. The output of the difference circuit 20 is connected to the input of an electronic switching device 23 capable of selectively supplying three indicating lights 24, 25 and 26.

Electronic circuit 19 operates and may be used in the following manner.

When the headlight 2 is properly adjusted in its lateral direction, the currents supplied by the cells 17 and 18 are equal. Difference circuit 20 supplies corresponding information to the electronic switching device 23 which causes illumination of the central indicating light 24 to provide an indication that headlight 2 is properly adjusted in the lateral direction. If, on the other hand, headlight 2 is offset in relation to its position of correct lateral adjustment, either towards the left or towards the right, then cells 17 and 18 are subjected to quantities of light which are such that the currents which photocells 17 and 18 supply are not equal, instead one or the other being greater. Difference circuit 20 then supplies corresponding information to electronic switching device 23 which causes illumination either of indicating light 25, if headlight 2 is offset towards the left, or of indicating light 26, if headlight 2 is offset towards the right. Using the indications from lights 24, 25 and 26, the operator who adjusts headlight 2 may adjust the angular adjustment of the headlight 2 in such a manner as to position it with correct lateral adjustment, so that central indicating light 24 is illuminated and indicating lights 25 and 26 are extinguished.

As has been seen previously, the vertical length of the cells 17 and 18 must be sufficient to permit the adjustment of headlight 2 in the lateral direction, regardless of the position of headlight 2 in its vertical direction. This is of particular interest in the configuration of FIG. 3, in which modification of the lateral adjustment involves modification of the vertical adjustment. In one example, if the maximum angular adjustment of the headlight 2 in the vertical direction is 1°30′, the minimum length of cells 17 and 18 must be twice the tangent of this angle multiplied by the focal length of lens 9. If the focal length of lens 9 is one meter, then the minimum length of the cells 17 and 18 must be fifty millimeters. In practice, a slightly greater length of cells 17 and 18 will be adopted, in such a manner that cells 17 and 18 will have, even in the position of maximum upward vertical adjustment of headlight 2, an unilluminated upper part, and in the position of maximum downward vertical adjustment of the headlight 2, the illuminated lower part of the cells 17 and 18 will be of a sufficient length to provide an adequate output.

Figure 6:
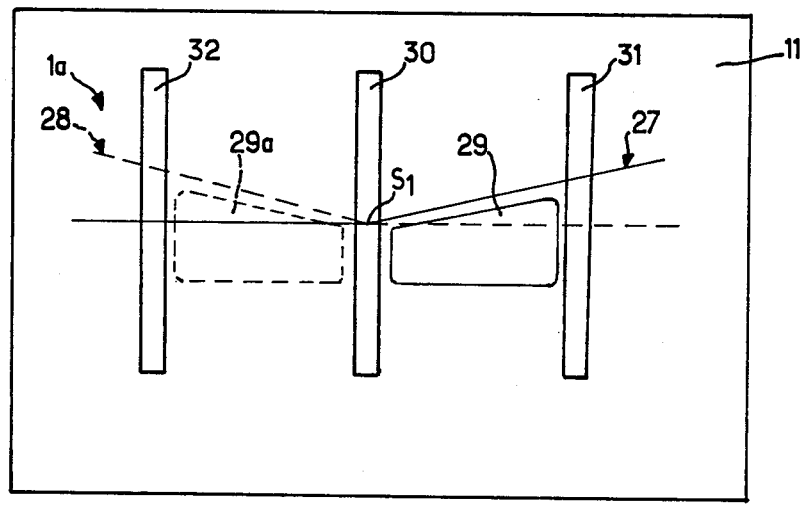
FIG. 6 represents a view, in the direction of arrow F of FIG. 1, of a second device according to the present invention.
Figure 7:
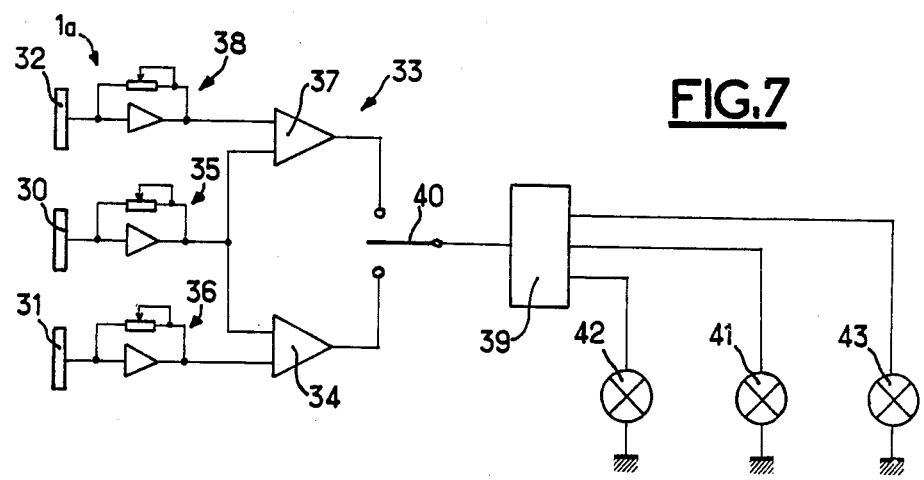
FIG. 7 represents an electronic circuit associated with the device shown in FIG. 6.

The device 1 which has just been described has a structure which permits the adjustment of headlights adapted for vehicles intended to be driven on the right. FIGS. 6 and 7 illustrate a device 1a which permits lateral adjustment not only of headlights adapted for vehicles intended to be driven on the right but also of headlights adapted for vehicles intended to be driven on the left.

FIG. 6, which is a view of plane 11 in the direction of arrow F in FIG. 1, shows in solid lines the V of cut-off 27 of the light beam of a headlight adapted for a vehicle intended to be driven on the right, which corresponds to the light beam of the previous example illustrated in FIG. 4. FIG. 6 also shows in dotted lines the V of cut-off 28 of a light beam of a headlight adapted for a vehicle intended to be driven on the left. These Vs of cut-off 27 and 28 are substantially symmetrical in relation to the vertical line passing through their common apex $S_1$.

The light beam exhibiting the cut-off line 27 exhibits, as in the previous example, a zone of more intense illumination 29, which is traced in solid lines, while the light beam exhibiting the cut-off line 28 exhibits a zone of more intense illumination 29a, which is traced in broken lines and which is substantially symmetrical to zone 29 in relation to the vertical line passing through the apex $S_1$.

The device 1a includes a central elongate photoelectric cell 30 as well as two lateral elongate photoelectric cells 31 and 32, the sensitive surfaces of which are in the vertical plane 11 shown in FIG. 1 and are turned towards the lens 9. Elongate photoelectric cells 30, 31 and 32 are disposed, in the vertical plane 11, vertically and at the same height.

When the headlight associated with the cut-off lines 27 and 28 are correctly adjusted in the lateral direction, the apex $S_1$ is situated substantially at the centre, in the width direction, of the central cell 30, which extends on the left-hand border of the zone of more intense illumination 29 and on the right-hand border of the zone of more intense illumination 29a. In such condition, the elongate photoelectric cell 31 extends along or on the right-hand border of the zone of more intense illumination 29, and the elongate photoelectric cell 32 extends along or on the border of the zone of more intense illumination 29a. It follows that each of the pair of elongate photoelectric cells 30 and 31 and the pair of elongate photoelectric cells 30 and 32 correspond, both with regard to their arrangement and with regard to their operation, to the pair of elongate photoelectric cells 17 and 18 of FIGS. 4 and 5. The pair of elongate photoelectric cells 30 and 31 is adapted for use in the lateral adjustment of a headlight the light beam of which in the low beam position exhibits the cut-off line 27, while the pair of elongate photoelectric cells 30 and 32 is adapted for use in the lateral adjustment of a headlight the light beam of which in the low beam position exhibits the cut-off line 28.

As before, the cells of the pairs of photoelectric cells 30, 31 and 30, 32 are provided and disposed in such a manner as to supply respectively currents which are equal when the headlights determining the cut-off lines 27 and 28 are properly adjusted in the lateral direction.

The device 1a also includes an electronic circuit 33 which is similar to electronic circuit 19 shown in FIG. 5.

The photoelectric cells 30 and 31 are connected to the two inputs of a comparator 34 via amplifiers 35 and 36. Cell 30 is also connected to one of the inputs of a comparator 37 via an amplifier 35, while photoelectric cells 32 is connected to the other input of comparator 37 via an amplifier 38. The outputs of comparators 34 and 37 are connected to an electronic switching device 39 via a manual two-position switch 40. The three outputs of electronic switching device 39 are respectively connected to three indicating lights 41, 42 and 43.

When the operator wishes to adjust the light beam of a headlight forming in plane 11 the cut-off line 27 and the zone of more intense illumination 29, which corresponds to a headlight of a vehicle intended to be driven on the right, the operator places manual switch 40 in its position in which the output of comparator 34 is connected to the input of electronic switching device 39. The operator can then use the electronic circuit formed by photoelectric cells 30 and 31, comparator 34, electronic switching device 39 and indicating lights 41, 42 and 43 in the same manner as the electronic circuit 19 shown in FIG. 5, in order to undertake the adjustment of this headlight, since its operation is identical.

If the operator wishes to adjust a headlight forming in plane 11 the cut-off line 28 and the zone of more intense illumination 29a which correspond to a headlight for a vehicle intended to be driven on the left, the operator places manual switch 40 in its position in which the output of the comparator 37 is connected to the input of electronic switching device 39. As before, the electronic circuit formed by the photoelectric cells 30 and 32, the comparator 37, electronic switching device 39 and indicating lights 41, 42 and 43 is equivalent to the electronic circuit 19 shown in FIG. 5 and operates and may be used in the same manner in order to undertake the lateral adjustment of this headlight.

The devices 1 and 1a are not limited to the lateral adjustment of headlights forming cut-off lines exhibiting a horizontal section and an inclined section. They may, in fact, likewise be used for the adjustment, in the lateral direction, of vehicle headlights forming Vs of cut-off exhibiting a vertical section and a horizontal section. In general, these headlights exhibit a zone of more intense illumination having an oval shape and disposed within the angle of the V, on both sides of which the pairs of elongate photoelectric cells of the devices described hereinabove may extend.

The present invention is not limited to the examples described hereinabove. Many modified embodiments are possible, without departing from the framework defined by the attached claims.

I claim:

1. A method of angular adjustment, in the lateral direction, of a vehicle headlight, in the low beam condition thereof, comprising directing the light beam from the headlight onto two vertically extending, elongate photoelectric devices to illuminate the lower portion of each device while leaving the upper portion of each device unilluminated; and laterally adjusting the headlight to cause the electrical output signals from the two photoelectric devices to have a specified ratio.

2. A method as claimed in claim 1 wherein the light beam is directed onto the two photoelectric devices with the devices on each side of the zone of more intense illumination of the light beam when the electrical output signals have the specified ratio.

3. Apparatus for use in the angular adjustment, in the lateral direction, of a vehicle headlight, in the low beam condition thereof, comprising:
 a lens adapted to be disposed in front of a vehicle headlight;
 first and second vertically extending elongate photoelectric devices;
 means positioning said photoelectric devices laterally adjacent each other and in the focal plane of said lens for focusing on the photosensitive surfaces thereof of the light beam from the headlight after passage of such light beam through said lens, for illumination of the lower portion of each device, while leaving the upper portion of each device unilluminated, to cause said photoelectric devices to provide two electrical output signals of a specified ratio when the headlight has the desired lateral adjustment;
 means for comparing the electrical output signals from said photoelectric devices to provide a comparison signal indicative of the lateral angular position of the headlight.

4. Apparatus as claimed in claim 3 further comprising indicating means responsive to the comparison signal for indicating the lateral angular position of the headlight in relation to the desired lateral adjustment.

5. Apparatus as claimed in claim 4 wherein said comparing means comprises a difference circuit adapted to provide a first comparison signal when the electrical output signals from said photoelectric devices are of the specified ratio indicating that the headlight has the desired lateral adjustment, a second comparison signal when the electrical output signals from said photoelectric devices are of a second ratio differing from one specified ratio in a first manner and indicating that the headlight lateral adjustment differs from the desired lateral adjustment in a first manner, and a third comparison signal when the electrical output signals from said photoelectric devices are of a third ratio differing from the specified ratio in a second manner and indicating that the headlight lateral adjustment differs from the desired lateral adjustment in a second manner.

6. Apparatus as claimed in claim 3 wherein each photoelectric device comprises an elongated photoelectric cell.

7. Apparatus as claimed in claim 3 wherein each photoelectric device comprises an elongated series of photoelectric cells.

8. Apparatus as claimed in claim 3 wherein said positioning means comprises means for positioning said photoelectronic cells on each side of the zone of more intense illumination of the light beam when the comparison signal indicates the desired lateral adjustment of the headlight.

9. Apparatus as claimed in claim 3 wherein said comparison means provides a comparison signal indicating that the electrical signals from said photoelectric devices are equal when the headlight has the desired angular adjustment.

10. Apparatus as claimed in claim 3 wherein said positioning means positions said photoelectric devices such that, with the headlight in the desired lateral adjustment, the apex of the V of cut-off of the light beam from the headlight is on said first photoelectric device.

11. Apparatus as claimed in claim 10 further comprising a third vertically extending elongate photoelectric device; wherein said positioning means positions said third photoelectric device laterally adjacent said first photoelectric device and in said focal plane, with said second and third photoelectric devices being symmetrically positioned about said first photoelectric device; and wherein said comparing means includes switching means adapted to assume alternatively a first switching position in which the electrical outputs of said first and second photoelectric devices are compared to provide the comparison signal, and a second switching position in which the electrical outputs of said first and third photoelectric devices are compared to provide the comparison signal.

12. Apparatus as claimed in claim 3 wherein said comparing means comprises a difference circuit adapted to provide a first comparison signal when the electrical output signals from said photoelectric devices are of the specified ratio indicating that the headlight lateral adjustment is the desired lateral adjustment, a second comparison signal when the electrical output signal from said photoelectric devices are of a second ratio differing from the specified ratio in a first manner and indicating that the headlight lateral adjustment differs from the desired lateral adjustment in a first manner, and a third comparison signal when the electrical output signals from said photoelectric devices are of a third ratio differing from the specified ratio in a second manner and indicating that the headlight lateral adjustment differs from the desired lateral adjustment in a second manner.

13. Apparatus as claimed in claim 5 wherein said indicating means comprises first, second and third indicator lights and connecting means coupling said difference circuit to said indicator lights and responsive to said first comparison signal to energize said first indicator light, responsive to said second comparison signal to energize said second indicator light, and response to said third comparison signal to energize said third indicator light.

14. Apparatus as claimed in claim 3 wherein each vertically extending elongated photoelectric device has a length at least equal to the product of the maximum vertical angular displacement of the headlight and the focal length of said lens.

* * * * *